United States Patent [19]

Scotese

[11] Patent Number: 4,989,341
[45] Date of Patent: Feb. 5, 1991

[54] RETRACTABLE FOOTBALL YARDAGE MEASURING APPARATUS

[76] Inventor: Joseph A. Scotese, 50 Main St., Apt. C-5, Binghamton, N.Y. 13905

[21] Appl. No.: 461,866

[22] Filed: Jan. 8, 1990

[51] Int. Cl.⁵ .............................................. G01B 3/10
[52] U.S. Cl. ...................................... 33/759; 33/762; 33/761
[58] Field of Search ................. 33/289, 755, 756, 759, 33/761, 762, 765, 767, 769; 116/222, 225

[56] References Cited

U.S. PATENT DOCUMENTS

| | | | |
|---|---|---|---|
| 537,082 | 4/1895 | Stuart | 33/762 |
| 1,684,566 | 9/1928 | Winkler | 33/759 |
| 2,064,745 | 12/1936 | Harrie | 33/759 |
| 2,151,130 | 3/1939 | Mattsson et al. | 33/767 |
| 2,335,105 | 11/1943 | Browning | 33/767 |
| 4,397,091 | 8/1983 | Gustavsson et al. | 33/761 |
| 4,756,087 | 7/1988 | Sing | 33/761 |

FOREIGN PATENT DOCUMENTS 1164073 10/1958 France ................................. 33/762

Primary Examiner—William A. Cuchlinski, Jr.
Assistant Examiner—William C. Dowling
Attorney, Agent, or Firm—Salzman & Levy

[57] ABSTRACT

The preferred embodiment of the invention features a yardage measuring device for determining the position of the ball on the field after each play, or down, in a football game. The device locks the chain at any given amount of advancement and a see-through window represents the exact distance from the nose of the ball to the nearest yardline. An alternate embodiment can be used as a replacement for the standard 10 yard chain.

18 Claims, 3 Drawing Sheets

RETRACTABLE FOOTBALL YARDAGE MEASURING APPARATUS

Field Of the Invention

The invention pertains to a retractable yardage measuring apparatus for use in a football game, and more particularly to a device which provides easier storage handling and easier mobility along sidelines, and allows an accurate determination of the yardline position of the football on the field and of the yardline position of the 10-yard chain on the sideline.

BACKGROUND OF THE INVENTION

Through over a century of football, the common ten yard device consisting of two poles and a fixed length of link chain disposed therebetween has been in continuous use. While this ten yard device has served the game of football adequately, it has several disadvantages. In moving the chain along the sideline on a first down, or change of possession, the link chain is dragged along the ground. Upon storage, the two poles are placed side by side and the link chain wrapped around the poles, resulting in wasted time in unwrapping the link chain when desired for use.

Also, the present ten yard device provides no means to measure and record intermediate distances. Such intermediate distances are usually marked off by eyesight. A down marker rod is set by eyesight on the sideline between downs to record the yardage position of the ball on the field. After an incomplete pass, a penalty, an out of bounds or an exchange of fields, the football is placed in position on the field by an official by eyesight. Also, on a first down or change of possession, the 10-yard chain is spotted on the sideline by eyesight.

This particular method is outstandingly outmoded in terms of providing suitable replacement of the football and of setting the 10-yard chain befitting modern standards.

In aligning two objects separated by 18 yards, which is the distance from either sideline to the nearest inbounds line, an error in alignment of one degree from parallel results in an error on the field of 11 inches.

It would be advantageous to improve the method by which the position of the football is determined, eliminating inaccuracies in referee and sideline crew judgment and/or eyesight.

With this objective in mind, the present invention provides a useful alternative and/or supplement to the standard uprights that is both simple and effective.

The present invention does not attempt to defy tradition, and has kept the improvement within narrow boundaries consistent with a respect for customary procedure and a love of the game.

One embodiment of the invention provides a rotatable rotor within a housing that attaches to one of the uprights and which precisely dispenses a given amount of chain as the two uprights are parted. The rotative position of the rotor is carefully maintained by means of a spring and ratchet mechanism.

In accordance with an alternate embodiment of the present invention, there is provided a rotatable rotor within a housing that is attached to an upright. The rotor dispenses up to five yards of chain, the free end of which can be attached to a link. Used in conjunction with a substantially identical apparatus, the respective free chain ends can be connected together by the link so that the total amount of chain between uprights is, of course, ten yards. The rotatable rotor in this embodiment is spring-loaded, but there is no need for a ratchet mechanism.

DISCUSSION OF RELATED ART

In U.S. Pat No. 1,684,566; issued: Sept. 18, 1928 to Winkler, a ten yard line device is shown with a measuring tape dispenser mounted upon one of two uprights.

While the above device accurately measures intermediate distances, it fails to lock the dispensed length of tape at its given position.

In addition, the tape spool also requires rewinding by hand, which is both cumbersome and time consuming. It is impractical to require a rewinding of dispensed tape, where the distance measurement is constantly changing during the game.

Still another disadvantage of the tape dispenser is the uneven playout of the tape from the spool.

The present invention seeks to overcome the disadvantages of the prior device, while maintaining an improved measurement and displaying of distances.

A previous yardage measuring system by the present inventor included a gear disposed exterior to the housing of the instrument. The gear was interrupted by a knife latch mounted for vertical operation. This previous apparatus represented a potential for malfunction due to the fact that on occasion the knife latch would not fully engage in a slot between the square teeth of the gear.

The fact that the latch mechanism was vertically disposed with respect to the instrument sometimes resulted in a misalignment, causing unnecessary time spent in engaging the latch with the gear. It would therefore be advantageous to provide a yardage measuring apparatus which would not have the potential for malfunction and which could be used repeatedly without fearing engagement misalignments.

The latch of the prior device had to be moved manually whether the chain was being dispensed or retracted. It would be advantageous to provide a system that would allow the latch to work automatically upon dispensing of the chain.

Moreover, the apparatus had no provision for detecting the amount of chain dispensed from a spool. It would also be advantageous to provide an apparatus for which measurement indications could be calibrated to determine the yardage required for a first down. Such an indication would be helpful in certain circumstances.

It would also be advantageous to place a ratchet within a housing for a streamlined design.

SUMMARY OF THE INVENTION

The invention, in its preferred embodiment, pertains to an eight foot measuring apparatus for use in football games. The device comprises a tether disposed between two poles or uprights. A dispensing cylindrical housing is attached to one of the poles and dispenses a given amount of tether equal to the distance between the nose of the football and the nearest yardline. The dispensing housing includes a rotatably mounted rotor. Even and smooth playout of the tether is assured by reason of a continuum of helical grooves disposed on the surface of the rotative rotor. The continuum evenly and precisely doles out the tether line which is disposed in, and wrapped around, the grooves.

The rotor is urged into winding the tether upon the rotor by means of a coiled spring which rotatively biases the rotor within the housing.

A ratchet disposed between the rotor and bottom cover of the housing locks the rotor in a precise position defining the dispensed length of tether, assuring that an accurate measurement is established and maintained, representative of the aforementioned distance.

A disk attached to the rotor has indicator markings on the surface thereof which show through a viewing window in the housing. The markings indicate the amount of tether that has been dispensed.

In an alternate embodiment of the present invention, there is provided a pair of five yard measuring devices, the combination providing a ten yard length of chain. Each of the pair of devices in this embodiment comprises a pole or upright. A dispensing cylindrical housing is attached to the pole and dispenses a given amount of tether up to five yards. The dispensing housing includes a rotatively mounted rotor. The rotor is urged into winding the tether upon the rotor by means of a coil spring which rotatively biases the rotor within the housing. A disk attached to the rotor has indicator markings on the surface thereof which show through a viewing window in the housing to indicate the amount of tether that has been dispensed. The unspooled free end of the chain of each five yard device is connected to one another by a link to form a continuous ten yard length of chain.

It is an object of this invention to provide an accurate apparatus for measuring distances in a football game.

It is another object of the invention to provide a measuring apparatus that will dispense a tether in an even manner without snagging and can be stored without tangling.

It is another object of this invention to retract the trailing pole with each down to mark the position of the football between downs, eliminating the down marker rod.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

Generally speaking, the invention features a measuring apparatus for determining distances in a football game.

In the preferred embodiment, the apparatus evenly plays out an accurate amount of chain up to eight feet and locks the chain setting into place. A see-through window indicates the amount of chain that has been dispensed, and thus provides an accurate indication of the distance between the ball and the nearest yardline Like elements will have the same designation throughout the figures.

Figure 1:
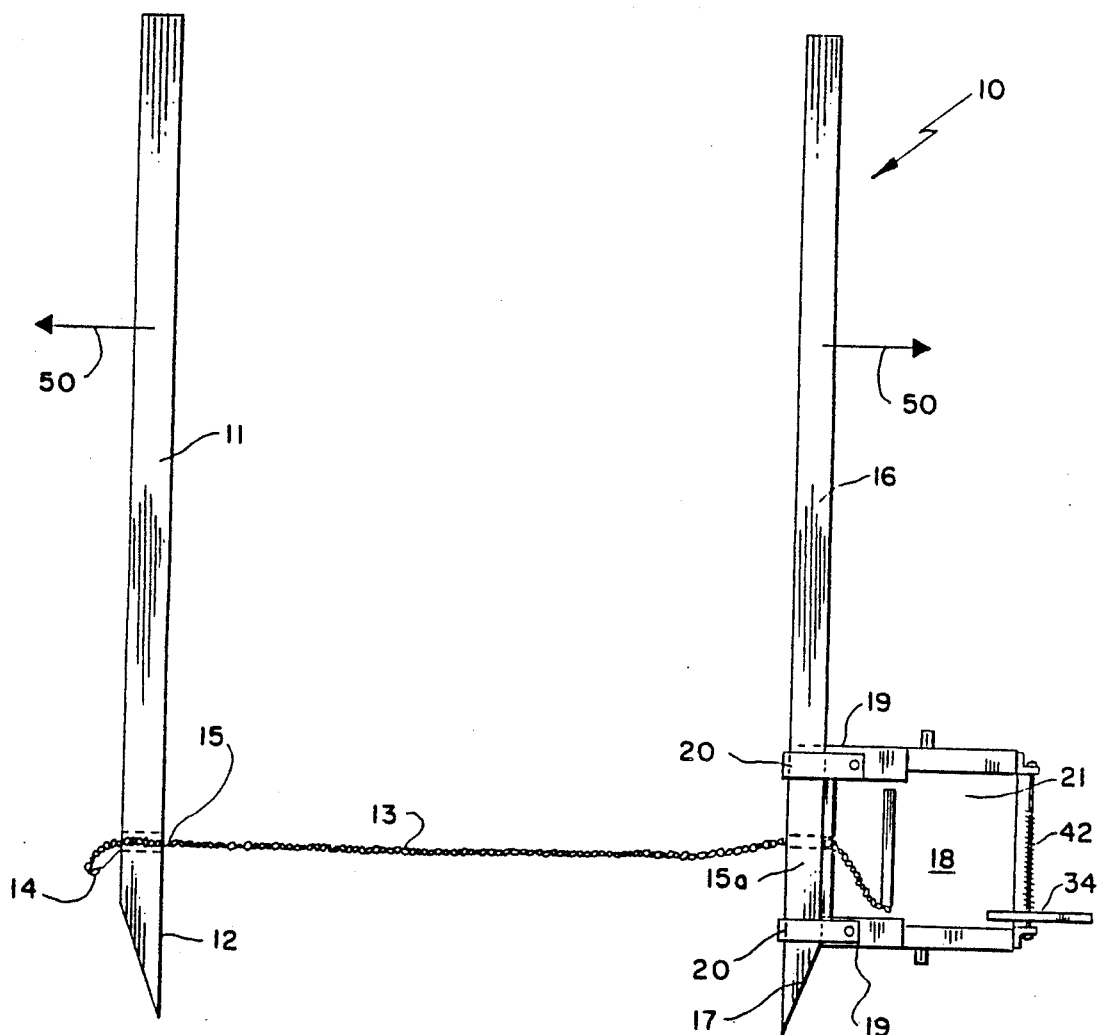
FIG. 1 is a front view of the eight foot measuring apparatus of the invention.

Now referring to FIG. 1, the eight foot measuring apparatus 10 of this invention is illustrated. The apparatus 10 comprises a first pole or upright 11, which has a wedge end 12 for placing on the ground at the nose of the ball.

A ball chain 13 or similar tethering means is connected through a hole 15 in pole 11 to screw eye 14 and passes through a hole 15a disposed in a second pole 16, which is placed at the nearest edge of the nearest yardline. Pole 16 also has a wedge end 17 for placing on the ground at the edge of the yardline.

The chain 13, which passes through pole 16, is stored and dispensed from a cylindrical dispenser 18, which is attached to pole 16 by means of clamps 20 and brackets 19, as shown.

The chain 13 feeds into and out of the dispenser 18 through a vertical slot 21, which will be explained in more detail with reference to FIG. 2.

Figure 2:
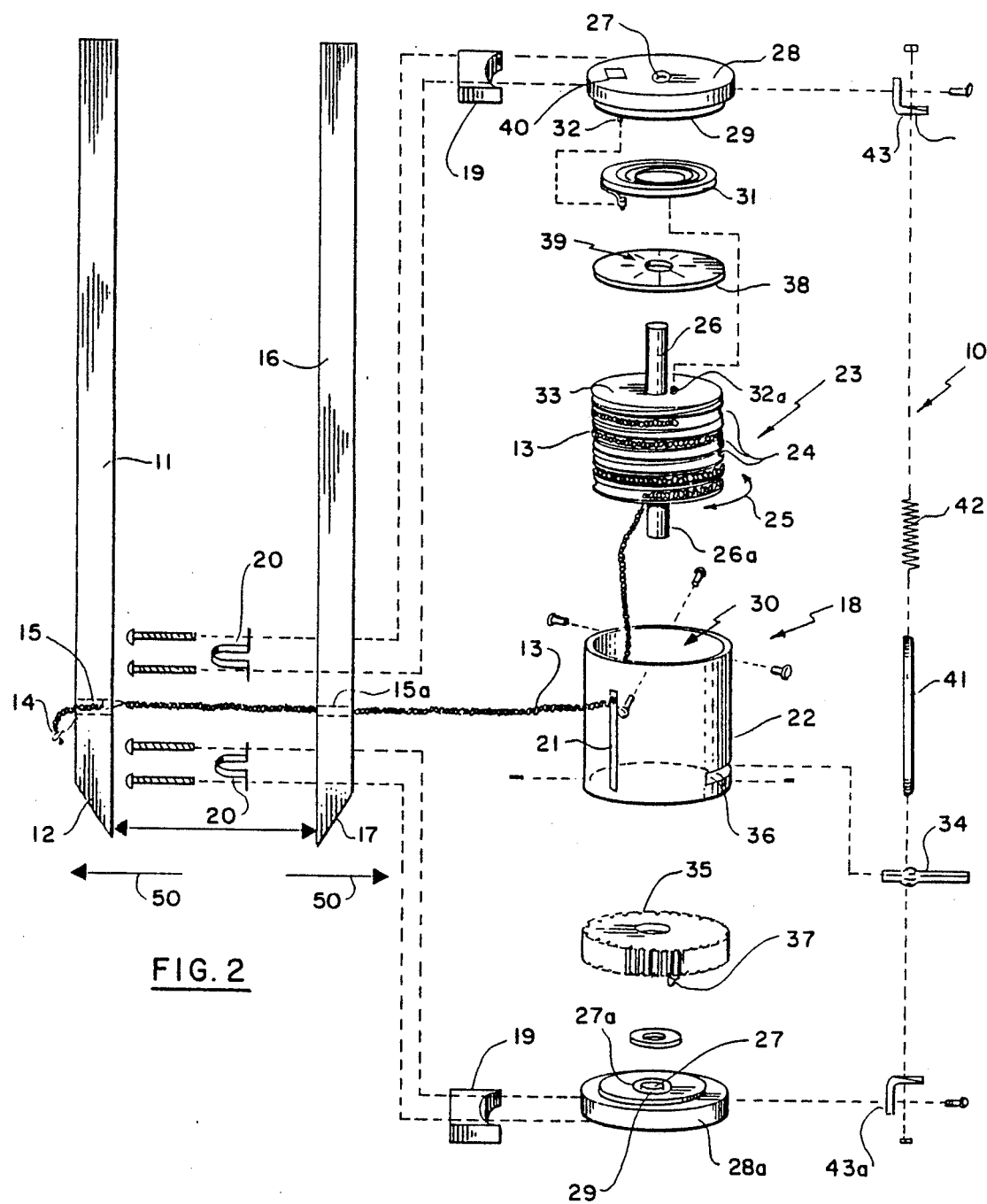
FIG. 2 is an exploded perspective view of the invention shown in FIG. 1.

FIG. 2 depicts the inner workings of apparatus 10 via an exploded, perspective view.

The dispenser 18 comprises a cylindrical housing 22. The housing 22 contains a rotatable rotor 23, having a 4" diameter in the preferred embodiment, and having a continuum of helical grooves 24 disposed on the surface thereof. The grooves 24 house over eight feet of chain 13, as illustrated. The chain 13 is wound upon and disposed within grooves 24.

Rotor 23 is mounted for rotation (arrows 25) within housing 22 by means of trunnions 26 and 26a, which are rotatively fixed in end bearings 27 of dispenser end covers 28 and 28a. Covers 28 and 28a have a concentric chamfered edge 29 that snaps into cylindrical wall of housing 22 and makes a snug fit with the inner wall 30 of housing 22.

The end bearings 27 can comprise a ball bearing race 27a to provide ease of rotation for the rotor 23.

A coil spring 31 is attached to pin connectors 32 and 32a. Specifically, the inner eye of spring 31 is connected to pin connector 32a on the upper surface of rotor 23. The outer eye of spring 31 is connected to the lower surface of top cover 28 by means of pin connector 32. The coil spring 1 urges the rotor 23 in a counterclockwise rotation so as to wind the chain 13 upon grooves 24. Conversely, when the chain 13 is dispensed out of housing 22, coil spring 31 rotates clockwise and becomes compressed.

Slot 21 is provided in housing 22 to dispense the chain and guide it onto and off the grooves 24 of rotor 23 without snagging.

A ratchet wheel 35 is fixedly mounted to the lower trunnion 26a of rotor 23, which passes therethrough.

As the rotor 23 is caused to rotate (arrows 25), the ratchet wheel 35 will rotate along with the rotor 23.

A releasable, spring-biased pawl 34, which projects through slot 36 in cylindrical housing 22, extends radially into the housing 22 and engages with the teeth 37 of the ratchet wheel 35.

The ratchet 35 and pawl 34 lock the rotor 23 at any given rotative position.

An indicator disk 38, having suitable rotation markings in inches 39, is fixedly mounted to the rotor 23 at pin connector 32a and rotates with the rotor 23. Of course, if disk 38 is not used, indicator markings may be provided directly on the upper surface of rotor 23. A yardage indication is observed via a see-through window 40 in upper end cover 28. This indication, when combined with the number of vacant grooves 24, viewed through slot 21, represents the distance from the nose of the ball to the nearest yardline.

The amount of rotation of rotor 23 is directly proportional to the amount of chain 13 wound upon or dispensed from rotor 23. Markings 39 are calibrated to indicate the amount of dispensed chain 13.

The pawl 34 is spring-biased by means of a guide 41 and coil spring 42, wrapped around guide 41, which connect to angle brackets 43 and 43a connected to end covers 28 and a, respectively. The ends of spring 42 are connected to guide 41 and pawl 34, respectively.

Apparatus 10 operates to dispense a given amount of chain 13 by the following procedural steps:

1. Pole 16 is placed on the ground at the nearest edge of the nearest yardline.
2. Pole 11 is pulled (arrow 50) away from pole 16, and placed on the ground at the nose of the ball. As pole 11 is pulled away from pole 16, the chain 13 is pulled out from slot 21 of dispenser 18, causing rotor 23 to rotate in a clockwise direction, thus releasing the stored chain disposed in grooves 24. Grooves 24 and slot 21 provide for a smooth even flow of chain without snagging When the end 12 of pole 11 is placed at the nose of the ball, the rotor 23 ceases rotating and is locked in place by ratchet wheel 35 and pawl 34.
3. The amount of dispensed chain 13 is then read through window 40 in conjunction with viewing the number of vacant grooves 24 through slot
4. The extended chain 13 can be further advanced by pulling upon pole 11 to a further distance, with pawl 34 releasing automatically.
5. The chain 13 can be partially or completely rewound upon rotor 23 by releasing the pawl 34 and allowing the pole 16 to approach or recontact pole 11. The biasing spring 31 causes rotor 23 to rotate in a counterclockwise direction to rewind the chain 13.

Figure 3:
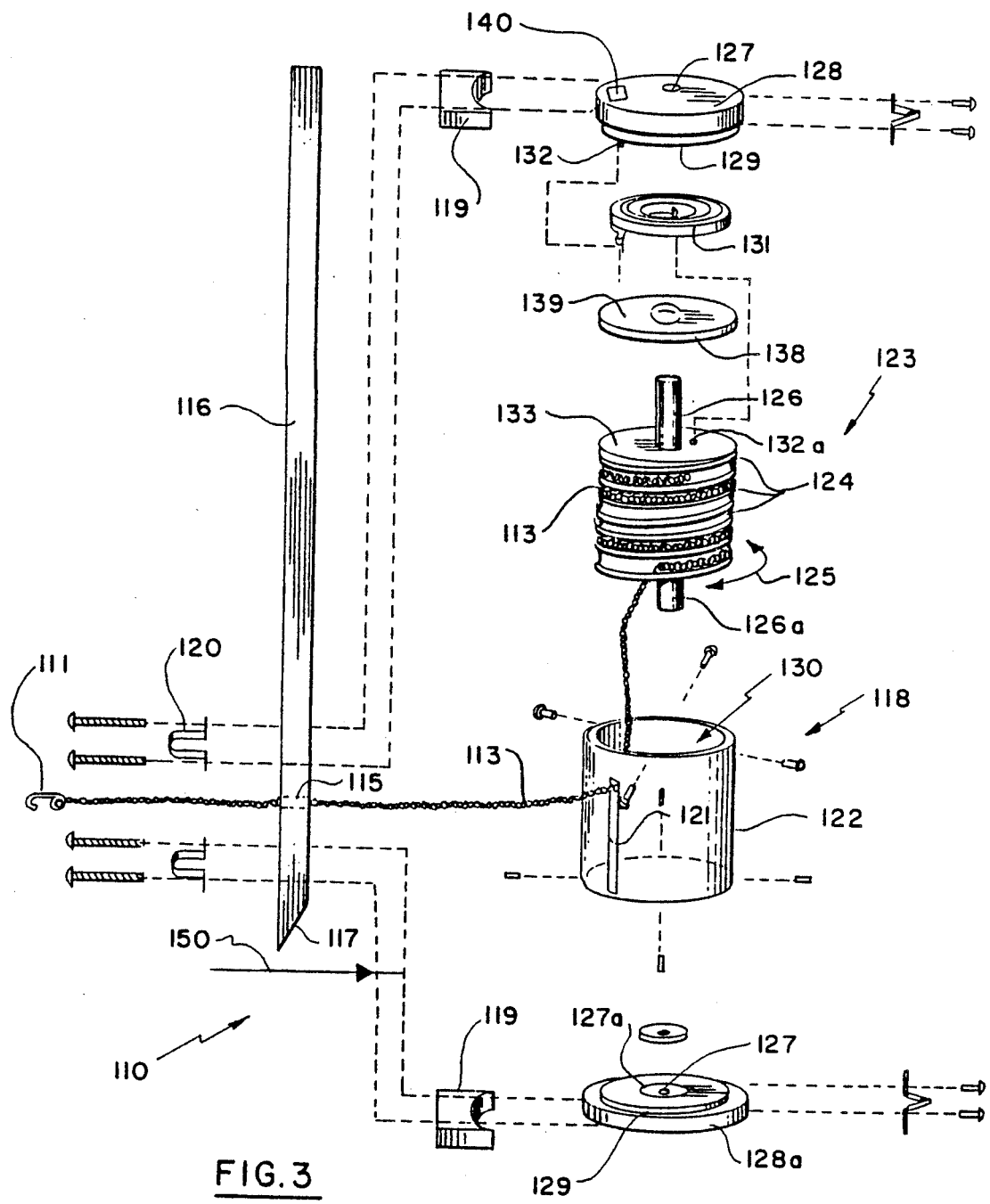
FIG. 3 is an exploded perspective view of the alternate embodiment five yard retractable apparatus.

FIG. 3 depicts a five yard retractable apparatus 110 in accordance with an alternate embodiment of the present invention.

The dispenser 118 comprises a cylindrical housing 122. The housing 122 contains a rotatable rotor 123, having a 6" diameter in this embodiment, and having a continuum of helical grooves 124 disposed on the surface thereof. The grooves 124 house five yards of chain 113, as illustrated. The chain 113 is Wound upon and disposed within grooves 124. The free end of chain 113 terminates in a link 111.

Rotor 123 is mounted for rotation (arrows 125) within housing 122 by means Of trunnions 126 and 126a, which are rotatively fixed in end bearings 127 of housing end covers 128 and 128a. Covers 128 and 128a have a concentric chamfered edge 129 that snaps into cylindrical wall of housing 122, and makes a snug fit with the inner wall 130 of housing 122.

The end bearings 127 can comprise a ball bearing race 27a to provide ease of rotation for the rotor 123.

A coil spring 131 is connected to pin connectors 132 and 132a. Specifically, the inner eye of spring 131 is connected to pin connector 132a on the upper surface of rotor 123. The outer eye of spring 131 is connected to the lower surface of top cover 128 by means of pin connector 132. The coil spring 131 urges the rotor 123 in a counterclockwise rotation so as to wind the chain 113 upon grooves 124. Conversely, when the chain 113 is dispensed out of housing 122, coil spring 131 rotates clockwise and becomes compressed.

Slot 121 is provided in housing 122 to dispense the chain 113 and guide it onto and off the grooves 124 of rotor 123 without snagging.

An indicator disk 138, having suitable rotation markings in inches 139, is fixedly mounted to the rotor 123 at pin connector 132a and rotates with the rotor 123. Of course, if disk 138 is not used, indicator markings may be provided directly on the upper surface of rotor 123. A yardage indication is observed via a see-through window 140 in upper end cover 128. This indication, when combined with the number of vacant grooves 124, viewed through slot 121, represents the distance from the nose of the ball to the line of scrimmage on first down.

The amount of rotation of rotor 123 is directly proportional to the amount of chain 113 wound upon or dispensed from rotor 123 Markings 139 are calibrated to indicate the amount of dispensed chain 113.

Apparatus 110 operates in conjunction with an identical apparatus to dispense up to 10 yards total of chain 113 by the following procedural steps:

1. Link 111 connects both free ends of two identical five yard retractable measuring device chains.
2. Pole 116 is pulled (arrow 150) away from its counterpart pole, pulling chain 113 out from slot 121 of dispenser 118, causing rotor 123 to rotate in a clockwise direction, thus releasing the stored chain disposed in grooves 124. Grooves 124 and slot 121 provide for a smooth even flow of chain without snagging. When the wedge end 117 of pole 116 is placed on the ground at the sideline demarking the yardage position of the nose of the ball on the field and the counterpart pole is likewise pulled away from pole 116 and comes to rest, the rotors 123 cease rotating
3. When five yards is reached for each device 110, an indicator of that event can be made by viewing indicator markings 139 through window 140 or by viewing appropriate markings, not shown, on the chain 113 itself. The chain 113 can be rewound upon rotor 123. The biasing spring 131 causes rotor 123 to rotate in a counterclockwise direction to rewind the chain 113.

While a preferred and an alternate embodiment are shown in the figures, it is understood that the description related thereto is of an exemplary nature, and can be modified as befits the skilled practitioner in this art.

For example, the dispenser 18 (FIG. 1) can be mounted to pole 16 in a concentric manner, rather than upon the side Pawl 34 can be spring-biased from inside housing 22 rather than outside, as shown.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A retractable yardage measuring apparatus for use in football games, comprising:
   a first pole for establishing a football position on a playing field;
   a second pole for referencing a yardline relative to said football;
   a tether disposed between said first and second poles, said tether anchored to said first pole by a screw eye and link and passing through a hole disposed in said first pole, said tether being dispensed through a hole disposed in said second pole;

dispensing means attached to said second pole for dispensing a given amount of said tether between said first and second poles equal to the distance between said yardline and said football, said dispensing means including a rotatable rotor for rotatively storing and dispensing said tether;

a housing for rotatively mounting said rotatable rotor;

biasing means connected between said housing and said rotatable rotor for urging the winding of said tether upon said rotatable rotor; and a ratchet and pawl disposed between said rotatable rotor and said housing for locking said rotable rotor in a rotative position defining a dispensed length of tether, whereby an accurate measurement is established and maintained of the distance between said football and said yardline after any football play.

2. The yardage measuring apparatus of claim 1, wherein said housing is attached to said second pole by brackets.

3. The yardage measuring apparatus of claim 1, wherein said housing is substantially cylindrical.

4. The yardage measuring apparatus of claim 1, wherein said rotatable rotor has a continuum of helical grooves disposed on a surface thereof for storing an eight foot length of said tether.

5. The yardage measuring apparatus of claim 1, wherein said tether comprises a ball-chain.

6. The yardage measuring apparatus of claim 1, wherein said rotatable rotor is rotatably disposed within said housing by means of trunnions affixed at ends of said rotor rotatively anchored in bearings of said housing.

7. The yardage measuring apparatus of claim 6, wherein said bearings comprise ball races.

8. The yardage measuring apparatus of claim 1, wherein said housing comprises a slot through which said tether is dispensed.

9. The yardage measuring apparatus of claim 1, wherein said biasing means comprises a coil spring connected between said housing and said rotatable rotor.

10. The yardage measuring apparatus of claim 1, wherein said housing includes a window and said rotor has indicator markings disposed on a surface thereof, which markings show through said window and represent the amount of tether that has been dispensed from said rotor.

11. A five yard retractable measuring apparatus for use in football games, comprising:
a pole placeable on a sideline for establishing a football position on a playing field on first down, said pole comprising a hole through which a tether is dispensed;

a tether attached to said pole and having attachment means connected to the free end thereof;

dispensing means attached to said pole for dispensing five yards of tether, said dispensing means including a rotatable rotor for rotatively storing and dispensing said tether;

a housing for rotatively mounting said rotatable rotor and having a slot through which said tether is dispensed; and biasing means connected between said housing and said rotatable rotor for urging the winding of said tether upon said rotatable rotor, whereby an accurate measurement is established and maintained of half of a ten yard distance from said first down football position.

12. The five yard measuring apparatus of claim 11, wherein said housing is substantially cylindrical.

13. The five yard measuring apparatus of claim 11, wherein said rotatable rotor has a continuum of helical grooves disposed on a surface thereof for storing said five yards of said tether.

14. The five yard measuring apparatus of claim 11, wherein said tether comprises a ball-chain.

15. The five yard measuring apparatus of claim 11, wherein said rotatable rotor is rotatably disposed within said housing by means of trunnions affixed at ends of said rotor and rotatively anchored in bearings of said housing.

16. The five yard measuring apparatus of claim 11, wherein said bearings comprise ball races.

17. The five yard measuring apparatus of claim 11, wherein said biasing means comprises a coil spring connected between said housing and said rotatable rotor.

18. The five yard measuring apparatus of claim 11, wherein said housing includes a window and said rotor has indicator markings disposed on a surface thereof, which markings show through said window and represent the amount of tether that has been dispensed from said rotor.

* * * * *